Nov. 30, 1926.
E. J. ELSAS
PISTON ASSEMBLY
Filed April 23, 1925
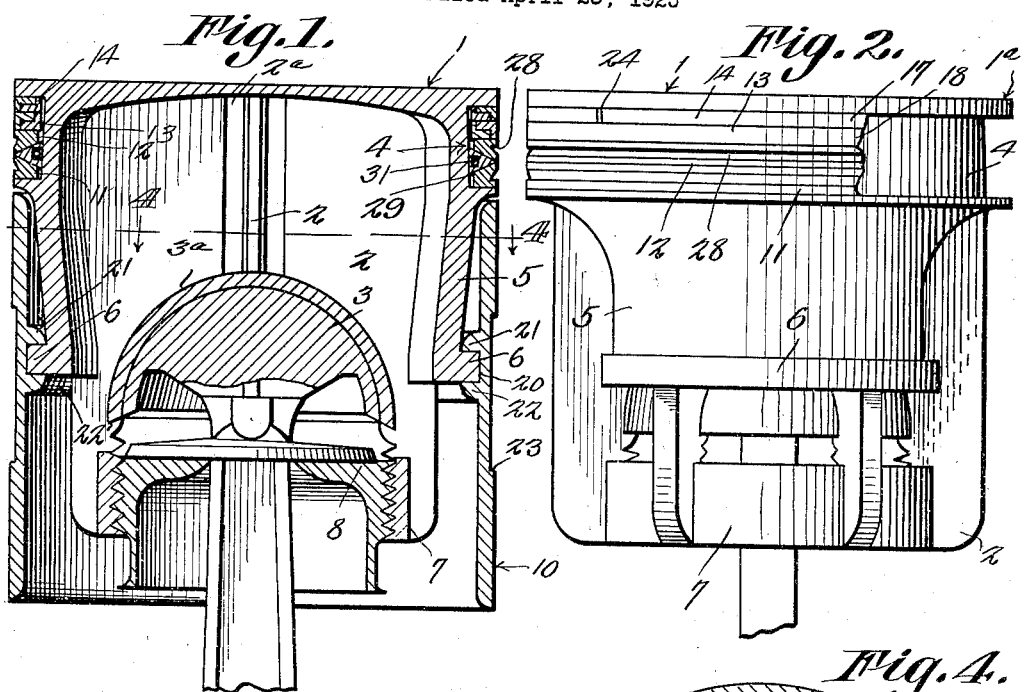
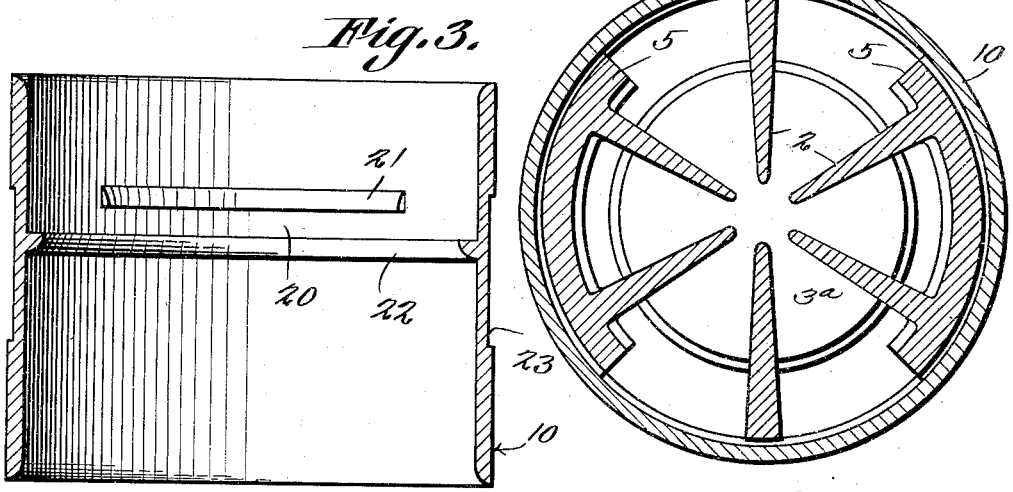
Inventor
E. J. Elsas
Attorneys Patented Nov. 30, 1926.

1,608,784

UNITED STATES PATENT OFFICE.

EDWARD J. ELSAS, OF KANSAS CITY, MISSOURI.

PISTON ASSEMBLY.

Application filed April 23, 1925. Serial No. 25,300.

This invention relates to pistons for internal combustion engines and more particularly to piston wall element construction.

The object of the invention is to provide a piston of this character equipped with a special skirt ring or cylinder and as assembly of piston rings having automatic means for adjusting and tightening the rings to compensate for wear.

Another object of the invention is to provide a piston ring assembly so constructed that they will fit tightly in their groove and against the cylinder wall as well.

Another object of the invention is to provide a simple, efficiently attached piston ring or cylinder consisting of a maximum portion of the piston length and floating free to avoid direct heat conduction from the piston head.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a vertical section of a piston constructed in accordance with this invention;

Fig. 2 is a side elevation of the piston head with the skirt removed;

Fig. 3 is a transverse section of the skirt detached;

Fig. 4 is a horizontal section taken on the line 4—4 of Fig. 1; and

Fig. 5 is an enlarged detail section of the head.

Fig. 6 is a detail plan of one of the packing rings.

The usual piston rings in pistons of this character depend for their insulating efficiency entirely upon their outward faces and the groove fit of their horizontal faces which are comparatively narrow and subject to immediate wear thereby causing inefficiency and leakage of power element and lubricant. It is to overcome these objections and others of the piston wall that this piston ring assembly has been designed.

In the embodiment illustrated the piston embodying this invention is composed of a head member 1 which is shown in detail in Fig. 2 and which is equipped with a system of interior preferably radial webs 2. These webs carry a piston rod bearing $3^a$ in the form of a hollow sphere section to receive a spherical shell segmental rod head 3 and they also support a skirt member 10. This peculiar form of piston however excepting the skirt and the wall of the head portion constitute no part of the invention since this piston wall construction may apply to pistons of other forms and bearings. The webs 2 terminate short of the piston head center to provide an air space $2^a$ to prevent direct conduction of heat to the bearing.

The head 1 is shown provided in its side wall on its outer face with an annular seat 4 in which are mounted a plurality of piston or packing rings, four being here shown and numbered 11, 12, 13 and 14. Of these rings the upper or inner pair 13 and 14 are each made in the form of two sections L-shaped in cross section, the outer sections being numbered 17 and 18 respectively while the inner sections are numbered $17^a$ and $18^a$ respectively. The inner concentric faces of the inner sections have no friction wear and consequently the concentric flanges thereof may be thinner than those on the outer sections to provide more breadth to the horizontal faces of the ring members.

The sections of these rings are arranged to fit snugly in each other as is shown clearly in Fig. 5 and they are of a width to fit tightly in the bottom of the groove or seat 4 to prevent all possibility of the passage of lubricant or power chemical. Each inner section fits tightly in the seat 4 and it will thus be seen that each of the inner sections of these rings operates as a dividing wall arranged between two wholly separate packing rings provided by the outer sections but are yet slidable relatively to each other to compensate for horizontal face wear.

The broad ring groove or annular seat 4 is made slightly deeper toward its upper end to provide room for heat expansion by permitting a slight clearance between the ring members or sections. This clearance is not necessary in the lower end of the groove because of the small amount of heat expansion in the ring groove at this point and therefore the gyration of the piston top under explosive shock is positively resisted.

That the inner sections of the L-sectioned rings may remain unexpanded and fit the bottom of their seat 4 tightly they are preferably threaded from one end over the piston corner 1ᵃ which is a natural and easy process of insertion adapted by this invention for all the rings.

The two sections of each L-shaped sectional rings normally have a slight clearance 19 between their concentric faces (see Fig. 5) adapted to admit power fluid to compress the outer section against the cylinder wall and its inner section tight down in its seat 4. The fluid enters through the opening 24 of the ring 18 and openings 25 cut through the tongue of the outer L-shaped section (see Fig. 6).

The rings 11 and 12 are preferably duplicates and each has a rectilinear horizontal face 26 while the opposite face thereof is beveled as shown at 27. The broader outer face of each ring has an oil groove 28 one wall of which is preferably horizontal and the other beveled. These rings are placed in the lower or outer part of the seat 4 with their beveled sides facing as shown in Figs. 1 and 5 which provides an annular groove substantially V-shaped in cross section and which is filled with a correspondingly shaped ring 29 having in its inner face an annular groove 30 which contains a high quality spring wire 31.

The object of this wedge-like ring 29 when the piston is in the cylinder is by means of its efficient degree of centrifugal or radial outward expansive force to press laterally upon the adjacent rings and so retain all of the lateral or horizontal faces of the rings and grooves, lubricant and power fluid tight. That this action may better prevail the rings 11 and 12 are equipped with broad slow wearing outer faces while ring 29 has its faster wearing apex arranged toward the cylinder wall.

The skirt ring or cylinder 10 is designed to provide the best piston guide possible while keeping the piston of minimum weight and size. Part of the space usually taken up by packing rings is occupied by this skirt which is long and extends near the piston head and thus best resists piston shock gyration and the slap caused by connecting rod side pressure.

The wall of head 1 has a plurality of contracted arcuate extensions 5 located in and clearing the skirt ring 10 to about its mid-length at which point on each of these extensions is formed a heavy annular or spirally disposed rib 6 preferably made rectangular in cross section and adapted to register with and engage in a correspondingly shaped groove 20 formed in the inner face of said skirt and on each side of which is arranged annular ribs 21 and 22. The outer rib 22 is made in the form of a complete ring to better retain the skirt ring and to guide said ring into its position upon the head. The skirt 10 has a shallow annular seat 23 located about its mid-length over its inner ribs and is designed to neutralize any possible unequal heat expansion at this point to prevent contacting thereof with the cylinder wall and which also operates as a lubricant retainer to prevent the free flow of the lubricant toward the ignition chamber.

The piston head is preferably constructed of a light metal having high heat conductivity and little adherence to carbon while its quick and high degree of expansion ensures in action extra tightness of the head to the skirt by expansion of the ribs 6, 6 in the skirt groove 20. The skirt is preferably constructed of a slow wearing and slow expanding material while the packing rings are preferably of the material and qualities claimed for phosphor bronze, the wire 31 being made of spring wire.

The webs 2 have on inner edges of their lower ends a threaded ring 7 which has threaded engagement with the rod carried member 8.

I claim:—

A piston including a head, a plurality of arcuate extensions forming a part of the head, a rib on the extensions, a sleeve having spaced ribs, said sleeve adapted to be positioned on the extensions so that the rib of the extensions will be held between the ribs of the sleeve to detachably connect the sleeve and head, said sleeve being disposed in spaced relation with the head at points above and below the connection between the head and sleeve, and means for connecting the piston rod to the head.

In testimony that I claim the foregoing as my own, I have hereto affixed my signature.

EDWARD J. ELSAS.